United States Patent
Genovese et al.

(10) Patent No.: US 12,436,077 B2
(45) Date of Patent: Oct. 7, 2025

(54) LUMINESCENT SENSOR FOR NANO/MICROPLASTICS

(71) Applicant: ALMA MATER STUDIORUM—UNIVERSITA' DI BOLOGNA, Bologna (IT)

(72) Inventors: Damiano Genovese, Bologna (IT); Luca Prodi, Bologna (IT); Enrico Rampazzo, Bologna (IT); Nelsi Zaccheroni, Bologna (IT)

(73) Assignee: ALMA MATER STUDIORUM—UNIVERSITA' DI BOLOGNA, Bologna (IT)

( * ) Notice: Subject to any disclaimer, the term of this patent is extended or adjusted under 35 U.S.C. 154(b) by 706 days.

(21) Appl. No.: 17/794,580

(22) PCT Filed: Jan. 19, 2021

(86) PCT No.: PCT/EP2021/051008
§ 371 (c)(1),
(2) Date: Jul. 21, 2022

(87) PCT Pub. No.: WO2021/148376
PCT Pub. Date: Jul. 29, 2021

(65) Prior Publication Data
US 2023/0122419 A1 Apr. 20, 2023

(30) Foreign Application Priority Data
Jan. 23, 2020 (IT) .................. 102020000001333

(51) Int. Cl.
*G01N 15/06* (2024.01)
*G01N 31/22* (2006.01)
*G01N 33/20* (2019.01)
*G01N 15/075* (2024.01)

(52) U.S. Cl.
CPC ............. *G01N 15/06* (2013.01); *G01N 31/22* (2013.01); *G01N 33/20* (2013.01); *G01N 15/075* (2024.01)

(58) Field of Classification Search
CPC ................. G01N 15/06; G01N 15/075; G01N 2015/0038; G01N 21/6408; G01N 21/643; G01N 31/22; G01N 33/20
See application file for complete search history.

(56) References Cited

FOREIGN PATENT DOCUMENTS

| CN | 105675566 A | * | 6/2016 | |
|---|---|---|---|---|
| CN | 106645049 B | | 5/2017 | |
| CN | 108587102 A | * | 9/2018 | ........... C08J 7/02 |

OTHER PUBLICATIONS

European Patent Office, International Search Report issued in PCT/EP2021/051008, mailed Mar. 26, 2021, Rijswijk, NL.
(Continued)

*Primary Examiner* — Jennifer Wecker
(74) *Attorney, Agent, or Firm* — Ferguson Case Orr Paterson

(57) ABSTRACT

A method for detecting nano- and micro-plastics in an aqueous sample suspected of being polluted with nano- or micro-plastics is provided. The method is based on interaction of the nano- and micro-plastics with hyaluronic acid functionalized with a luminescent or fluorescent dye. The luminescent or fluorescent dye is Rhodamine B or the metallorganic complex $Ru(bpy)_3^{2+}$.

10 Claims, 4 Drawing Sheets

(56) References Cited

OTHER PUBLICATIONS

Ingvild Kvam Darbo, Master thesis—Retention of Microplastic Particles in Road Side Ditches, Nov. 13, 2019, retrived from the Internet on Sep. 16, 2020: URL: https://nmbu.brage.unit.no/nmbu-xmlui/handle/11250/2628368, Norwegian University of Life Sciences, Ås, NO.
Thomas Maes et al., A rapid-screening approach to detect and quantify microplastics based on fluorescent tagging with Nile Red, Scientific Reports, Mar. 16, 2017, Article No. 44501, vol. 7, No. 1, Nature.
Rafal Fudala et al., Fluorescence detection of hyaluronidase, Journal of Photochemistry and Photobiology B: Biology, published online Jun. 12, 2011, pp. 473-477, vol. 104, No. 3, Elsevier Science S.A., Basel, CH.
Eyley S. and Thielemans W., Surface modification of cellulose nanocrystals, Nanoscale, Jul. 21, 2014, pp. 7764-7779, vol. 6, No. 14, Royal Society of Chemistry, London, GB.
European Patent Office, International Written Opinion issued in PCT/EP2021/051008, mailed Mar. 26, 2021.

\* cited by examiner

LUMINESCENT SENSOR FOR NANO/MICROPLASTICS

CROSS-REFERENCE TO RELATED APPLICATIONS

This application is a National Phase Application of PCT International Application No. PCT/EP2021/051008, having an International Filing Date of Jan. 19, 2021 which claims the benefit of priority to Italian Patent Application No. 102020000001333, filed Jan. 23, 2020, each of which is hereby incorporated by reference in its entirety.

FIELD OF THE INVENTION

The present invention relates to the field of environmental pollutant detection, in particular to a method for detecting the presence of nano- and micro-plastics in aqueous samples—such as seawater—and biological samples.

BACKGROUND OF THE INVENTION

The very recent awareness in the public opinion of the high degree of pollution—especially of water—originating from micro- and nano-plastics (MNPs) and of the possible harmful effects on living species, is pushing to find sensitive and simple methods for the recognition, visualization and quantification of these materials, both in water and in biological samples. Currently, there is no method that presents all the necessary features to satisfy these requirements.

CN108587102 describes environmental micro-plastics labeled by a metal organic fluorescent complex and the preparation method thereof. The fluorescently labeled micro-plastic is used to analyze the distribution, migration, metabolism, and enrichment of micro-plastic pollutants in complex environmental media and organism. Accordingly, the disclosed method does not allow the analysis of an unknown sample.

CN105675566 discloses a method for quantitatively analyzing the enrichment and distribution of micro-plastics in mammals. However, the method requires synthesizing microplastics with fluorescent markers. Similarly to the method of CN108587102, the disclosed method does not allow the analysis of an unknown sample.

CN106645049B describes a method for detecting the plastics content of marine organisms, wherein sample is treated by digestion in a strongly alkaline environment, then separated by centrifugation and finally observed with fluorescence and FTIR microscopy. However, the expected sensitivity is low.

SUMMARY OF THE INVENTION

In order to overcome the drawbacks of the prior art, the present invention provides a method of detecting micro- and nano-plastics (MNPs) in an aqueous sample suspected of being polluted with MNPs, which comprises the following steps:
   contacting the aqueous sample suspected of being polluted with MNPs with an aqueous solution of hyaluronic acid functionalized with a luminescent dye as the sensing probe, thereby obtaining a test sample;
   illuminating the test sample with a light source capable of exciting the luminescent dye;
   measuring a luminescence parameter obtained from the test sample upon illumination, wherein the luminescence parameter is selected from the luminescence intensity and the luminescence lifetime; and
   comparing the luminescence parameter obtained from the test sample with the same luminescence parameter obtained from a background sample, wherein the background sample is the aqueous sample suspected of being polluted with nano- or micro-plastics in the absence of the sensing probe,
   wherein an increase in the luminescence intensity or a variation in the luminescence lifetime of the test sample as compared to the background sample is indicative of the presence of nano- or micro-plastics in the aqueous sample.

Further features and advantages of the method of the invention are defined in the dependent claims. The claims form an integral part of the description.

DETAILED DESCRIPTION

Figure 1:
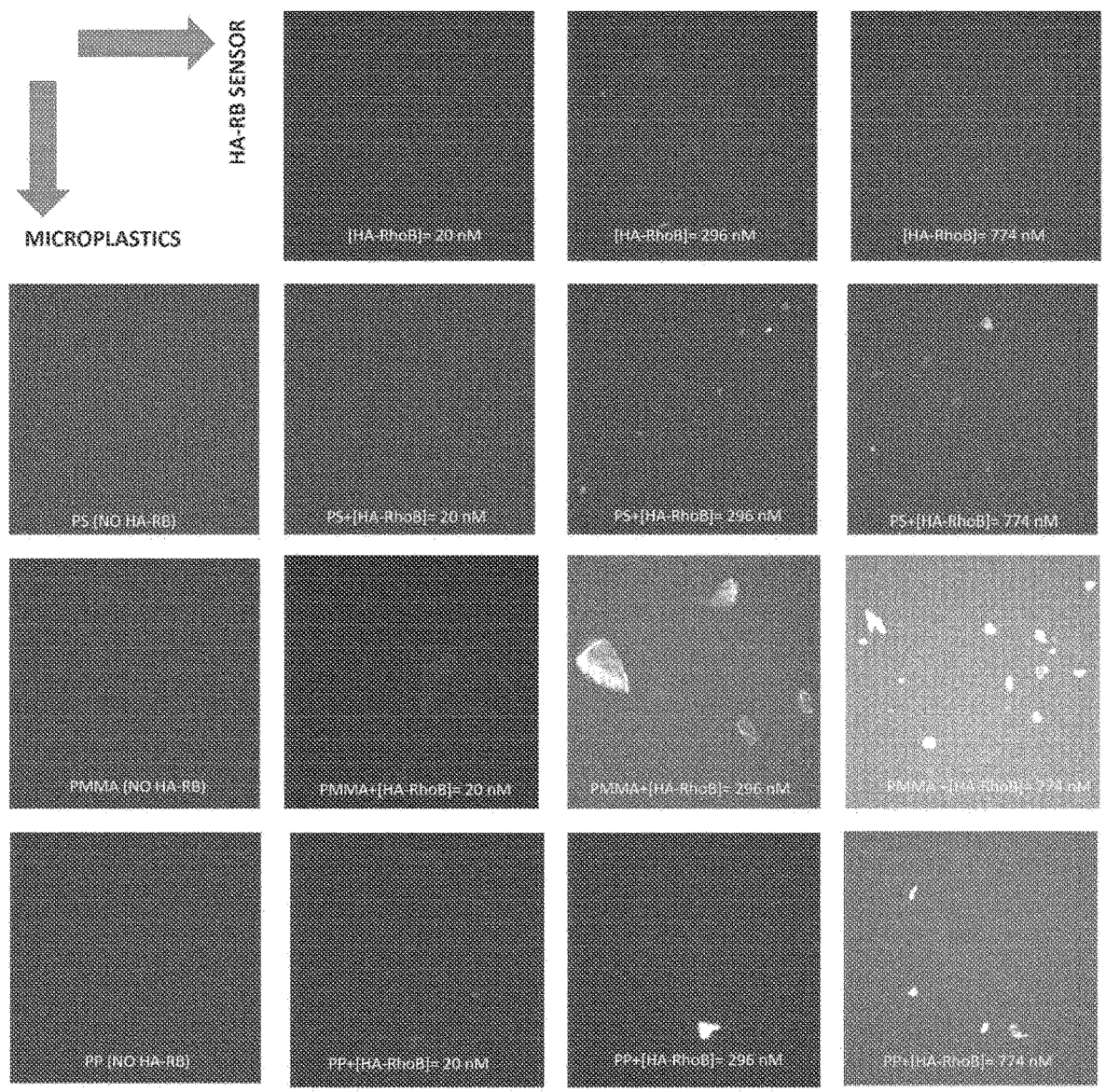
FIG. 1 shows wide-field fluorescence micrographs relative to different microplastics and increasing HA-RB probe concentration.

In the present description, the term "microplastics" encompasses very small pieces of plastic that pollute the environment. Microplastics are not a specific kind of plastic, but rather any type of plastic fragment that is less than 5 mm in length according to the U.S. National Oceanic and Atmospheric Administration (NOAA).

The term "nanoplastics" defines smaller pieces of plastics characterized by size in the sub-micrometer scale. The term "nanoplastics" is still under debate, and different studies have set the upper size limit at either 1000 nm or 100 nm.

The method of the invention is based on the finding that hyaluronic acids functionalized with luminescent dyes strongly interact with MNPs, triggering dramatic changes in their fluorescence intensity and excited state lifetime, allowing to visualize MNPs at low concentration. The accumulation of the probes—i.e. hyaluronic acids functionalized with luminescent dyes—on a set of MNPs fragments of different size, plastic type, and origin (commercial or from research use), results in a local luminescence signal on the MNPs that appears much higher compared to the background, which was measured for both MNPs and probe separately. In addition, analysis by imaging microscopy reveals that the probe not only accumulates onto the MNPs fragments, but also changes its own photophysical properties (and in particular the fluorescence lifetime, which is measured for example by Fluorescence-lifetime imaging microscopy (FLIM) upon the occurrence of the interaction with the MNPs surface. These changes also depend on the nature of MNPs, allowing them to distinguish among different types of MNPs. The latter feature is especially promising for both detection and recognition of MNPs composition in water environment.

As mentioned, the method of the invention makes use of hyaluronic acid molecules functionalized with luminescent dyes as the probe.

The molecular weight range of hyaluronic acid is preferably comprised between 8 and 1500 KDa, more preferably between 150 and 500 KDa, even more preferably between 190 and 195 KDa.

The hyaluronic acid concentration in the aqueous solution used as the sensing probe is preferably of at least 100 nM, more preferably within the range of from 100 nM to 800 nM, such as 296 nM, 428 nM, or 774 nM.

Preferred luminescent dyes are fluorescent rhodamines (particularly Rhodamine B) and the metallorganic complex $Ru(bpy)_3^{2+}$. Other luminescent dyes suitable for use in the method of the invention are e.g. xantenes, bodipys, coumarins, perylenes and cyanines.

The method of the invention is suitable for use in applications related to the analysis and imaging of MNPs both in the water environment and in biological samples, offering a high sensitivity and the possibility to distinguish among different types of materials with simple and inexpensive methodologies.

Advantageously, it offers high sensitivity, with low costs and simple implementation by means of highly biocompatible systems. It is directly applicable using instrumentation that is quite widespread and that is based on a well-established technology such as fluorescence microscopes (both wide field and confocal microscopy) and, in perspective, also instrumentation that uses the technology on which (flow) cytofluorometers are based. It also offers the possibility to differentiate between the MNPs composition material.

Accordingly, the method of the invention is particularly suited for environmental and toxicological analyses.

The following examples illustrate the experimentations carried out by the present inventors and the results obtained.

In particular, both wide field fluorescence imaging microscopy and fluorescence lifetime imaging microscopy (FLIM) measurements were carried out, on bare micro-plastics, HA-RB probe alone and micro-plastics in the presence of HA-RB probe (where HA stands for hyaluronic acid and RB stands for Rhodamine B).

The results obtained by wide field fluorescence imaging microscopy show that bare microplastics and HA-RB alone yielded negligible fluorescence, when compared to the fluorescence signal observed in samples containing both microplastics and HA-RB, in particular for concentration of HA-RB higher than 100 nM. In this last case, the signal from microplastics is more intense and clearer for larger microplastics (tens of microns) but also fragments smaller than one micron are visible with the method of the invention.

Figure 2A:
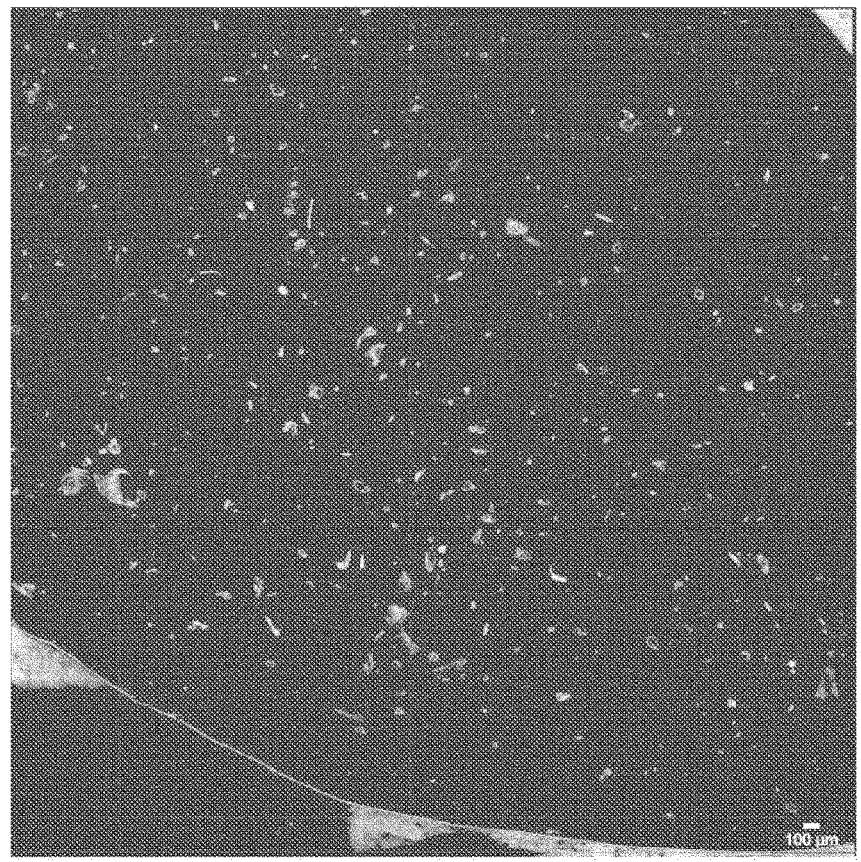
FIG. 2A is an image of PMMA microplastics in the presence of the fluorescent probe HA-RB.
Figure 2B:
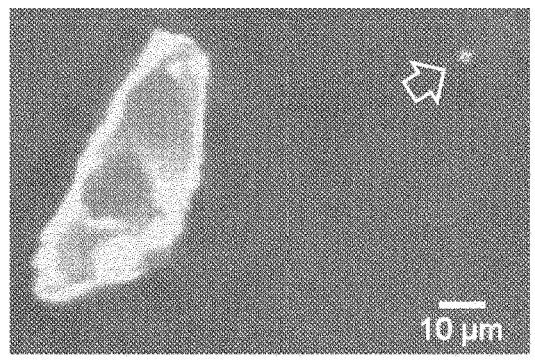
FIG. 2B is an enlarged view of a detail of FIG. 2A.
Figure 2B:
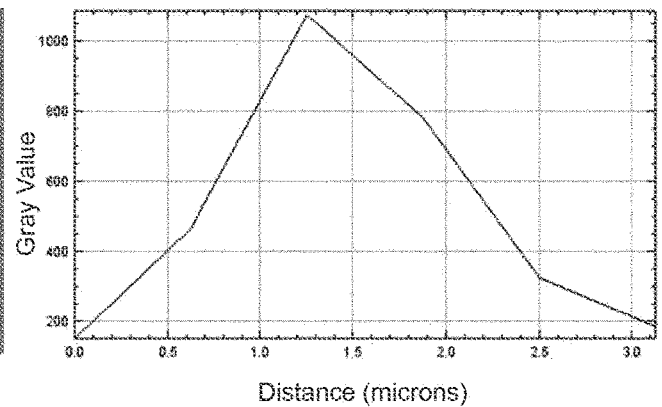

These results are shown in FIGS. 1, 2A and 2B. FIG. 1 shows the wide-field fluorescence micrographs (with the same acquisition and brightness & contrast showing parameters) relative to different microplastics (horizontal lines) and increasing HA-RB probe concentration (vertical columns). The first line from the top shows the typical fluorescence signal of the HA-RB probe, while the first column shows the negligible fluorescence signal observed from the microplastics in the absence of the fluorescent probe HA-RB. Micrographs measure 820 microns in side. FIG. 2A is an image of PMMA microplastics in the presence of the fluorescent probe HA-RB employed at a concentration of 100 nM. Confocal microscope, excitation 561 nm and emission 590/30 nm.) FIG. 2B is an enlarged view of a detail of FIG. 2A, showing a small PMMA microplastic fragment of about 1 micron in diameter.

It is expected that by using larger magnification objectives nano-plastics will also be detected, as it will be shown below with reference to the FLIM imaging measurements.

Also from FLIM measurements, bare micro-plastics yielded a negligible intensity compared to the fluorescence signal observed in the presence of both micro-plastics and HA-RB probe, confirming the previous observation of wide-field fluorescence microscopy, i.e. that the analyzed signal is exclusively provided by the interaction of the HA-RB probe with the micro-plastics with no interferences from the bare micro-plastics samples. In addition, the signal from water samples containing only HA-RB without micro-plastics was very low, matching the background of the reported FLIM images in FIG. 3.

Figure 3:
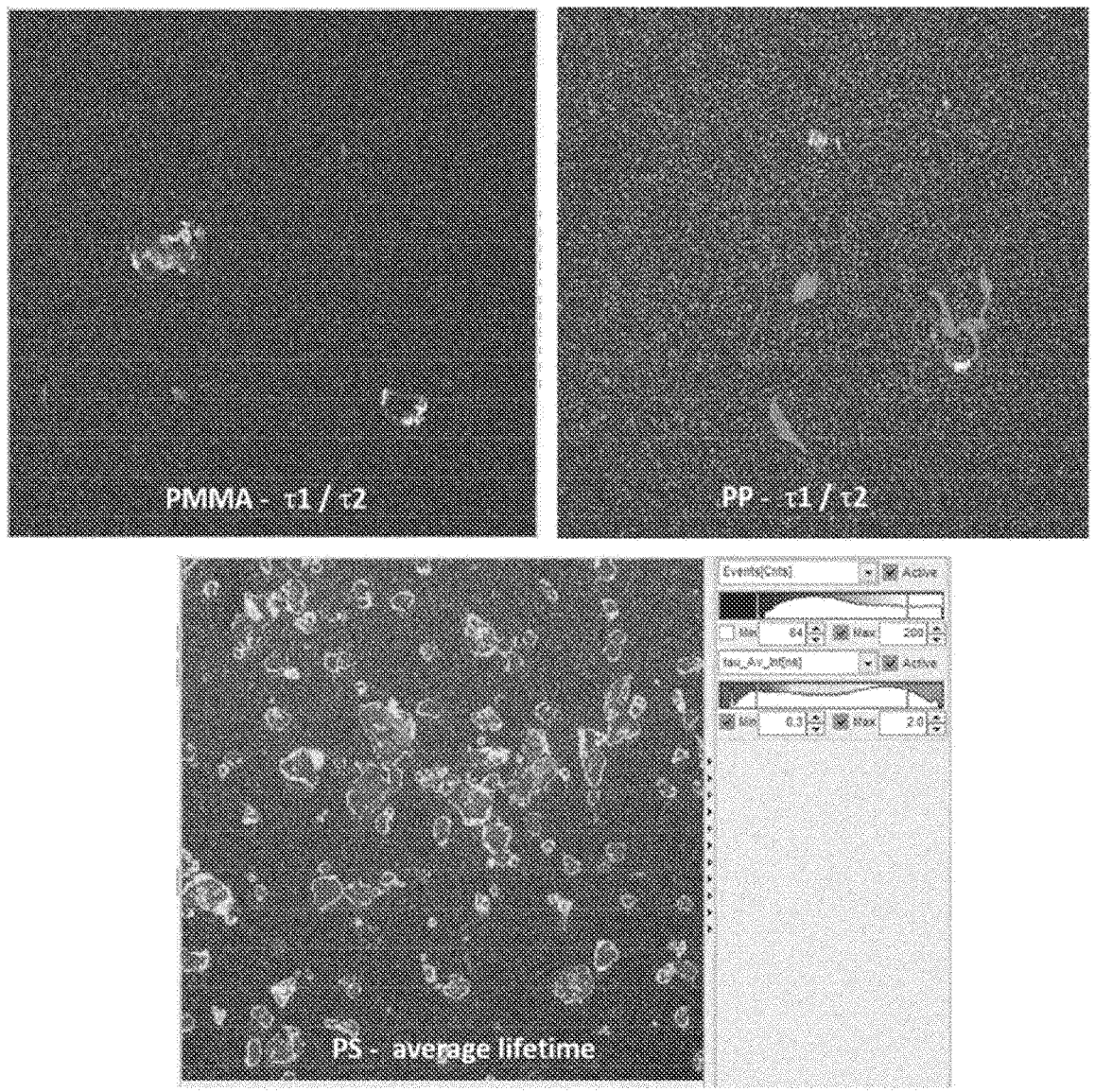
FIG. 3 shows FLIM micrographs.

These results are shown in FIG. 3, which shows the FLIM micrographs obtained, expressed as the ratio between the two main lifetime components from PMMA and PP ($\tau 1$ and $\tau 2$, short and long components respectively) and as the average lifetime map for polystyrene, which shows a net decrease of the average lifetime.

Both wide field and FLIM images prove that the HA-RB probe accumulates on microplastics, giving a much higher signal than the background. In addition, FLIM images show that HA-RB not only accumulates onto the micro-plastics fragments, but also that the photo physical properties (and in particular the fluorescence lifetime) change upon interaction with said fragments. Indeed, as shown in FIG. 3, the lifetime recorded on the microplastics is markedly different from the lifetime recorded from the background, resulting in different colors in the FLIM images (reported as maps of average lifetime).

In particular, as reported in Table 1 below, the average lifetime (about 1.6 ns in the background, thus from sparse HA-RB probe) increases to 2.1 ($\tau_{av,\,int}$) on PMMA fragments (with longest lifetime component of 2.7 ns), and decreases to 1.2 and 1.4 ($\tau_{av,\,init}$) on PS and PP fragments respectively. (with shortest lifetime components of 0.7 and 0.9 ns).

Therefore. HA-RB allows distinguishing, via its fluorescence lifetime, the type (chemical nature) of plastics on which it is adsorbing.

TABLE 1

FLIM data of HA-RB polymer in the presence of micro-plastics.

| | Lifetime at 585 nm, from background (sparse HA-RB) | | Lifetime at 585 nm, from micro-plastics fragments | |
|---|---|---|---|---|
| | $\tau_1$/ns ($a_1$) $\tau_2$/ns ($a_2$) | $\tau_{av,\,int}$/ns $\tau_{av,\,amp}$/ns | $\tau_1$/ns ($a_1$) $\tau_2$/ns ($a_2$) | $\tau_{av,\,int}$/ns $\tau_{av,\,amp}$/ns |
| PS | 1.1 (1830) 2.2 (900) | 1.7 1.5 | 0.4 (8600) 1.9 (2300) | 1.2 0.7 |
| PMMA | 1.1 (2300) 1.9 (3200) | 1.7 1.6 | 1.1 (7000) 2.7 (4400) | 2.1 1.7 |
| PP | 1.3 (1500) 2.1 (3800) | 1.6 1.5 | 0.5 (3500) 1.9 (1500) | 1.4 0.9 |

$\tau_{av,\,int}$/ns is the intensity weighted average lifetime while $\tau_{av,\,amp}$/ns is the amplitude weighted average lifetime of the decay calculated for a region of interest (ROI); Images contain 512*512 pixels.

Figure 4:
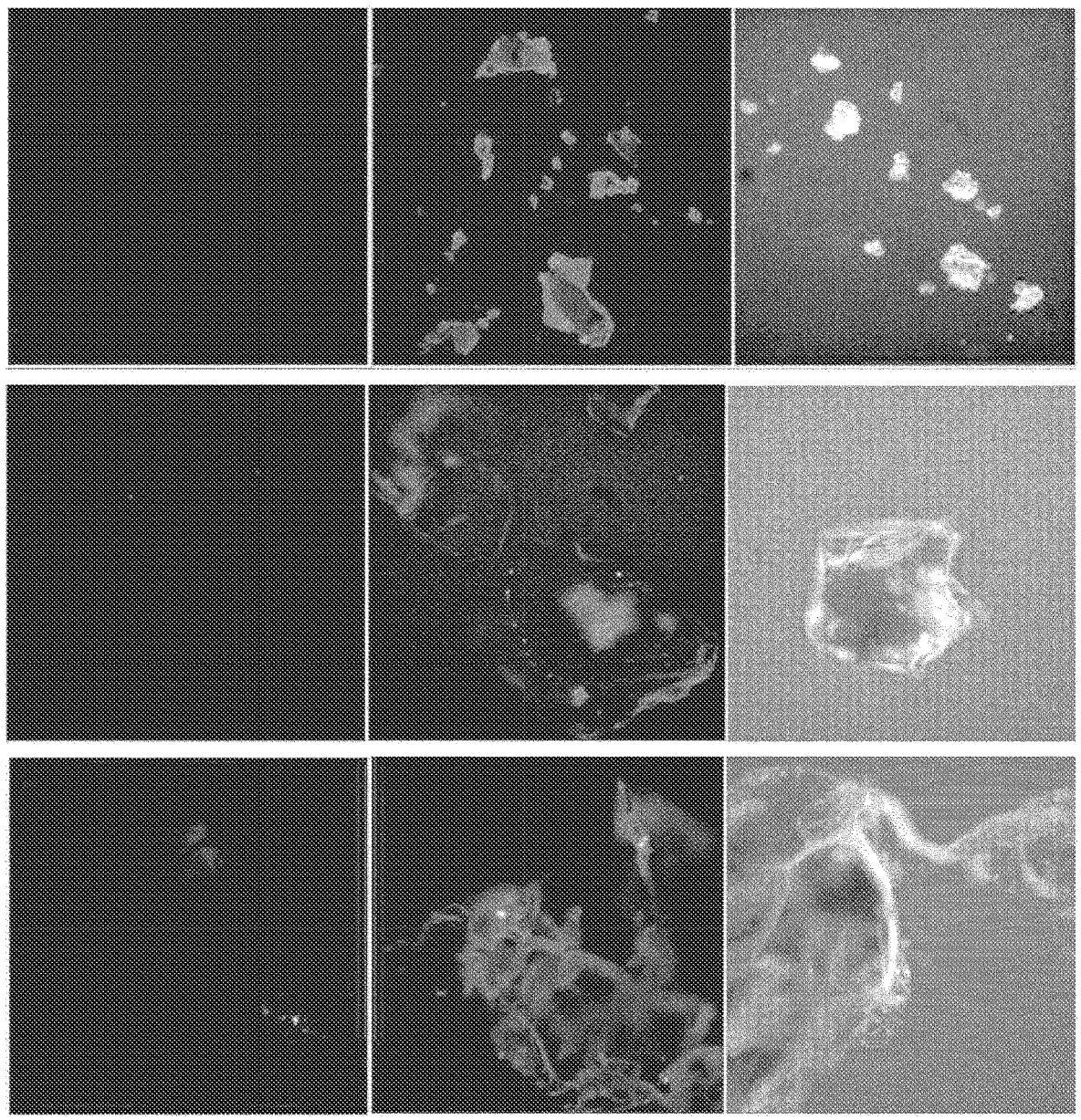
FIG. 4 is a table of wide-field fluorescence micrographs of micro-plastics in water in absence and presence of HA functionalized with $Ru(bpy)_3^{2+}$.

To prove that the observed interaction is not merely characteristic of the HA-RB probe, the inventors tested HA covalently labeled with another luminescent dye, namely the metallorganic complex $Ru(bpy)_3^{2+}$. As shown in FIG. 4, also this HA derivative shows a good affinity for a variety of micro-plastics and is able to highlight their presence by means of luminescence under a fluorescence microscope.

FIG. 4 is a table of the wide-field fluorescence micrographs of micro-plastics in water, in the absence (left) and in the presence of HA functionalized with $Ru(bpy)_3^{2+}$ at a concentration of 0.13 µM (center) and 0.66 µM (right). From top to down, micro-plastics are polystyrene (PS), polymethylmethacrylate (PMMA) and polypropylene (PP), respectively.

It is concluded that HA functionalized with various luminescent dyes is able to reveal the presence of micro-plastics by means of fluorescence. The affinity of the interaction and the ability to provide a useful luminescent signal that tightly depends on the characteristics of the dye of choice (e.g. luminescence quantum yield, self-quenching, and hydrophobicity). Therefore, while the inventors have proven that the principle works with two HA derivatives (HA-RB and HA-Ru(bpy)$_3^{2+}$) it is expected that many other HA derivatives (for example, various dyes belonging to families of xantenes, bodipys, coumarin, perylenes, cyanines etc.) are able to interact with micro-plastic fragments and highlight their presence by luminescence.

The following examples are provided by way of illustration only and are not intended to limit the scope of the invention as defined by the appended claims.

EXAMPLES

Example 1: Preparation of the Fluorescently Labelled Hyaluronic Acid Sensor

HA-RB nanogels are obtained via reaction of hyaluronic acid (193±2 KDa) with Rhodamine B isothiocyanate in DMSO, which proceeds through nucleophilic attack of the methyl-hydroxyl group of the polysaccharide to the reactive isothiocyanate groups, as reported previously for similar polymers (Eyley S, Thielemans W (2014) Surface modification of cellulose nanocrystals. Nanoscale 6(14):7764-7779). In a typical preparation, 50 mg of hyaluronic acid 193±2 KDa (0.26 µmol) were dispersed in 12 ml of DMSO in a scintillation vial and 9 mg of Rhodamine B isothiocyanate (16.8 µmol) were successively added under magnetic stirring. The initially insoluble HA is progressively dispersed during the reaction in the DMSO solvent and a homogeneous transparent dispersion is obtained after a few hours. The reaction proceeds for 24 h at room temperature and the resulting dispersion is dialyzed against water, to obtain a non-turbid, concentrated, aqueous dispersion of HA-RB nanogels. After work-up, the effective dye doping degree was evaluated by UV-vis analysis measuring the absorbance of Rhodamine B, while the weight of the product matched with the starting amount of HA, indicating that no significant loss of materials occurred during synthesis and work-up, except for the unreacted RB. Effective derivatization degree amounted to 1 fluorophore each 25 HA repeat units. i.e., about 19 dyes per polymer chain.

HA-RB nanogels at 100 nM concentration in PBS feature hydrodynamic diameter dH=150±35 nm with PdI=0.255 (from DLS measurements) and a negative zeta-potential of −17±2 mV. Absorption spectrum of HA-RB in water reveals a low value of the peak over shoulder ratio ($A_{560}/A_{530}$=1.2) indicating that RB dyes are heavily aggregated at the ground state. The aggregation is also confirmed by the very low emission quantum yield (0.019) compared to the one of RB in water (0.30). The observed mono-exponential decay ($\tau_{average}$=1.58 ns) of HA-RB indicates—since it is very similar to the one observed for non-aggregated RB in water (1.68 ns)—that the small emission signal observed can be assigned to a minority of RB dyes not suffering from heavy quenching, while most RB dyes are completely quenched and thus non-emissive. Furthermore, even the rather high emission anisotropy (r=0.10±0.02) is in agreement with these assumptions, indicating that the emissive RB dyes are bound to the nanogels and are not freely diffusing in water.

Example 2: Photo Physical Characterization

All sample solutions show very weak light scattering and can be treated from the photophysical point of view as any solution of molecular species. UV-vis absorption spectra were recorded at 25° C. by means of Perkin-Elmer Lambda 45 spectrophotometer. Quartz cuvettes with optical path length of 1 cm were used. The fluorescence spectra were recorded with an Edinburgh FLS920 equipped with a photomultiplier Hamamatsu R928P. The same instrument connected to a PCS900 PC card was used for the TCSPC experiments. Luminescence quantum yields were determined using rhodamine 101 solution in ethanol as a reference ($\Phi$=1.0). All fluorescence intensities were corrected for inner filter effects and reabsorption of emitted light according to standard methods.

The effective dye doping degree was evaluated by UV-vis analysis measuring the absorbance of Rhodamine B, at known concentration of HA-RB, in ethanol, where the absorption spectrum features similar properties as the free dye, allowing us to use with a reasonable assumption the molar extinction coefficient of the free Rhodamine B dye in ethanol (106000 $M^{-1}cm^{-1}$).

Example 3: Preparation of the Sensing Probe Solution and of the Microplastics Samples for the MNPs Detection Method Hyaluronic acid functionalized with rhodamine B (HA-RB) was taken from a stock solution where it was stored at 4° C. and at a concentration of 4 µM (concentration of polymer chains). Due to the presence of some naturally occurring aggregates of HA-RhoB during time, the stock solution was centrifuged at 5000 rpm for 10 minutes to precipitate larger aggregates, and the clear pink supernatant was carefully collected in a smaller vial.

Different dilutions from the stock solution were prepared and tested with the microplastics: 20 nM; 80 nM; 296 nM; 428 nM; 774 nM.

Micro-plastic samples: polystyrene (PS); polymethylmethacrylate (PMMA); polypropylene (PP). These plastic samples were obtained by grinding and milling plastic cuvettes (PS and PMMA) and a commercially available plastic box (PP). Due to their hydrophobicity, each of the micro-plastics was vigorously agitated in a vial with bidistilled water in order to have a fragments suspension.

Example 4: Wide-Field Fluorescence Image Acquisition Procedure

For each sample of micro-plastics, fluorescence images of the micro-plastics in the absence and in the presence of the HA-RB sensing probe solution were acquired in a wide-field microscope (see specifications below). In addition, also images of HA-RB in the absence of micro-plastics were taken under the same experimental conditions.

The same procedure was applied for each microplastics sample in the absence of the sensing probe solution.

Then, images of the different micro-plastics samples in the presence of all of the aforementioned dilutions of the sensing probe solution acquired with the previous criteria: both in emission and transmitted light.

The optical parameter was not changed during all the acquisitions.

Wide-Field Fluorescence Microscopy Parameters
 Objective lens: 10×
 Acquisition time: 100 msec
 Source: Xe-Lamp
 Emission filter: 570-610 nm
 Excitation filter: 510-540 nm
 Dichroic: RITC/550 nm
 Amplified CCD Gain: all the images were acquired with 3000 gain value Example 5: FLIM (Fluorescence Lifetime Imaging Microscopy) Acquisition Procedure The FLIM experiment were performed in a similar fashion as wide-field fluorescence measurements. FLIM images for each sample of micro-plastics were acquired in the absence and in the presence of HA-RB sensor. In addition, also images of HA-RB in the absence of micro-plastics were taken under the same experimental conditions.

The invention claimed is:

1. A method for detecting nano- and micro-plastics in an aqueous sample suspected of being polluted with nano- or micro-plastics, the method comprising:
    contacting the aqueous sample suspected of being polluted with nano- or micro-plastics with an aqueous solution of hyaluronic acid functionalized with a luminescent dye as a sensing probe, thereby obtaining a test sample;
    illuminating the test sample with a light source configured to excite the luminescent dye;
    measuring a luminescence parameter obtained from the test sample upon illumination, wherein the luminescence parameter is selected from luminescence intensity and luminescence lifetime; and
    comparing the luminescence parameter obtained from the test sample with a same luminescence parameter obtained from a background sample by either a wide field microscopy method or a confocal microscopy method, wherein the background sample comprises the aqueous sample suspected of being polluted with nano- or micro-plastics in an absence of the sensing probe, wherein an increase in luminescence intensity or a variation in the luminescence lifetime of the test sample as compared to the background sample indicates a presence of the nano- or micro-plastics in the aqueous sample.

2. The method of claim 1, wherein the aqueous sample is seawater or a biological sample.

3. The method of claim 1, wherein the nano- or micro-plastics are selected from the group consisting of polystyrene (PS), polymethylmethacrylate (PMMA), polypropylene (PP) and any combination thereof.

4. The method of claim 1, wherein the hyaluronic acid has a molecular weight varying from 8 to 1500 kDa.

5. The method of claim 1, wherein the luminescent dye is selected from the group consisting of rhodamines, luminescent metallorganic complexes, xantenes, bodipys, coumarins, perylenes and cyanines.

6. The method of claim 5, wherein the luminescent dye is Rhodamine B or $Ru(bpy)_3^{2+}$.

7. The method of claim 1, wherein the luminescence parameter is the luminescence lifetime and an increase in the luminescence lifetime obtained from the test sample as compared to the background sample is indicative of the presence of polymethylmethacrylate (PMMA) nano- or micro-plastics in the aqueous sample.

8. The method of claim 1, wherein the luminescence parameter is the luminescence lifetime and a decrease in the luminescence lifetime obtained from the test sample as compared to the background sample is indicative of the presence of polystyrene (PS) or polypropylene (PP) nano- or micro-plastics in the aqueous sample.

9. The method of claim 1, wherein the hyaluronic acid has a molecular weight varying from 150 to 500 kDa.

10. The method of claim 1, wherein the hyaluronic acid has a molecular weight varying from 150 to 195 kDa.

* * * * *